United States Patent [19]

Ochiai et al.

[11] Patent Number: 5,787,379
[45] Date of Patent: *Jul. 28, 1998

[54] LOCKUP CONTROL SYSTEM FOR AUTOMATIC TRANSMISSIONS

[75] Inventors: Tatsuo Ochiai, Fujisawa; Koichi Hayasaki, Ebina; Masayuki Furuya, Sagamihara, all of Japan

[73] Assignee: Nissan Motor Co., Ltd., Yokohama, Japan

[*] Notice: The term of this patent shall not extend beyond the expiration date of Pat. No. 5,545,107.

[21] Appl. No.: 352,354

[22] Filed: Dec. 8, 1994

[30] Foreign Application Priority Data

Dec. 22, 1993 [JP] Japan .................. 5-324547
Dec. 24, 1993 [JP] Japan .................. 5-328727

[51] Int. Cl.$^6$ .............. G06G 7/70; F16H 61/58
[52] U.S. Cl. .................. 701/68; 701/67; 701/93; 701/51; 477/63; 477/169; 180/178; 192/3.3; 192/3.31
[58] Field of Search .............. 364/424.1, 424.01, 364/426.04, 431.07; 477/118, 125, 126, 62, 63, 166, 168, 169, 174, 175, 80, 86, 77, 70, 74, 171, 180; 180/178, 175; 192/3.3, 3.31, 3.57, 3.58

[56] References Cited

U.S. PATENT DOCUMENTS

| | | | |
|---|---|---|---|
| 4,457,410 | 7/1984 | Suga et al. | 192/3.31 |
| 4,463,842 | 8/1984 | Redzinski | 477/63 |
| 4,509,124 | 4/1985 | Suzuki et al. | 364/424.1 |
| 4,539,869 | 9/1985 | Suga et al. | 477/174 |
| 4,577,737 | 3/1986 | Nikara et al. | 477/174 |
| 4,715,145 | 12/1987 | Takeda et al. | 477/175 |
| 4,867,194 | 9/1989 | Hayasaki et al. | 477/117 |
| 4,961,484 | 10/1990 | Kato et al. | 192/3.31 |
| 4,966,263 | 10/1990 | Hayasaki | 192/3.3 |
| 5,074,371 | 12/1991 | Shibayama | 364/426.04 |
| 5,097,723 | 3/1992 | Hayasaki | 477/119 |
| 5,138,907 | 8/1992 | Okahara et al. | 477/138 |
| 5,161,434 | 11/1992 | Hayasaki | 477/146 |
| 5,209,318 | 5/1993 | Miyahara et al. | 364/426.04 |
| 5,545,107 | 8/1996 | Ochiai | 477/169 |

FOREIGN PATENT DOCUMENTS

| | | |
|---|---|---|
| 63-235764A | 9/1988 | Japan . |
| 266366A | 3/1990 | Japan . |
| 2236056 | 9/1990 | Japan . |
| 658403A | 3/1994 | Japan . |
| 6185606 | 7/1994 | Japan . |
| 324547 | 7/1995 | Japan . |
| 324549 | 7/1995 | Japan . |

OTHER PUBLICATIONS

"Nissan RE4R01A Type Full–Range Electronic Control Automatic Transmission", (Jan. 1987), pp. I–6 –I–90.

*Primary Examiner*—Jacques H. Louis-Jacques
*Attorney, Agent, or Firm*—Foley & Lardner

[57] ABSTRACT

A lockup control system for automatic transmissions is constructed to prohibit lockup of a torque converter when detecting inertia cruising of a motor vehicle even if transition of the cruising state of the motor vehicle occurs from a converter area to a lockup area.

9 Claims, 6 Drawing Sheets

LOCKUP CONTROL SYSTEM FOR AUTOMATIC TRANSMISSIONS

BACKGROUND OF THE INVENTION

The present invention relates to a system for carrying out lockup control of automatic transmissions for motor vehicles.

In order to improve fuel consumption, the automatic transmissions of the lockup type, which improve the transmission efficiency, are more frequently adapted, where when the torque increasing function or torque variation absorbing function is not needed, a torque converter can be put in the lockup state wherein input and output elements thereof are directly coupled.

Conventionally, lockup control of such torque converter is carried out, for example, in a way as described in Maintenance Manual of NISSAN RE4R01A Type Full-Range Electronic Control Automatic Transmission. That is, it is determined in which area the cruising state of a motor vehicle is found, in a lockup area or converter area, which is defined by the throttle opening or engine load and the vehicular velocity in connection with a predetermined speed or every speed, and in accordance with a result of determination, the torque converter is put in the lockup state wherein the input and output elements thereof are directly coupled or in the converter state wherein direct coupling of the input and output elements thereof is released.

As to such conventional lockup control technique, however, the torque converter is locked up only in accordance with the result of determination, so that even when passing from acceleration state of the motor vehicle to inertia cruising (coasting) thereof, the state of the torque converter is changed from the converter state to the lockup state by alteration of the throttle opening, causing the following problem:

During inertia cruising of the motor vehicle, a throttle valve of an engine is rather closed, so that engine speed is considerably low. On the other hand, in the same way as shift control of the automatic transmission, lockup of the torque converter is carried out by hydraulic fluid out of a pump driven by the engine. Due to low engine speed during inertia cruising, the amount of hydraulic fluid out of the pump is small, which enables maintenance of the lockup state of the torque converter, but fails to enable transition from the converter state of the torque converter to the lockup state thereof, resulting in unreliable lockup control of the torque converter.

Such an unstable lockup area is given as an area of the throttle opening, which area is lower than a so-called load—load line indicative of the vehicular velocity vs. the throttle opening necessary to maintain it.

In this connection, when the cruising state of the motor vehicle is shifted within the lockup area, it is sufficient to simply maintain the lockup state of the torque converter, so that even if the amount of hydraulic fluid out of the pump is small due to engine speed lowered in connection with the unstable lockup area, no inconvenience is produced. However, when the cruising state of the motor vehicle is shifted from the converter area to the lockup area, it is necessary to change the state of the torque converter from the converter state to the lockup state, so that if the amount of hydraulic fluid is small due to engine speed lowered in connection with the unstable lockup area, changeover of the state of the torque converter is not reliably carried out.

This uncertain changeover holds a large clearance between a lockup clutch piston and a converter cover that should come in press contact therewith, increasing the amount of hydraulic fluid drained therethrough, so that lubrication in the rear portion of the automatic transmission is insufficiently carried out, which is to be ensured with the amount of hydraulic fluid of the torque converter having the drained amount of hydraulic fluid eliminated, resulting in reduced durability of the automatic transmission.

It is, therefore, an object of the present invention is to provide a lockup control system for automatic transmissions that contributes to an improvement of the durability of the automatic transmissions.

SUMMARY OF THE INVENTION

According to one aspect of the present invention, there is provided a system for carrying out lockup control of an automatic transmission for a motor vehicle having a cruising state in a converter area and a lockup area, the automatic transmission provided with a torque converter, the system comprising:

means for determining an occurrence of transition of the cruising state of the motor vehicle from the converter area to the lockup area and generating a transition signal indicative of said occurrence of transition determined;

means for detecting an inertia cruising of the motor vehicle and generating an inertia cruising signal indicative of said inertia cruising detected; and means for prohibiting lockup of the torque converter when said inertia cruising signal is detected even if said transition signal is generated.

According to another aspect of the present invention, there is provided a method of carrying out lockup control of an automatic transmission for a motor vehicle having a cruising state in a converter area and a lockup area, the automatic transmission provided with a torque converter, the method comprising the steps of:

determining an occurrence of transition of the cruising state of the motor vehicle from the converter area to the lockup area and generating a transition signal indicative of said occurrence of transition determined;

detecting an inertia cruising of the motor vehicle and generating an inertia cruising signal indicative of said inertia cruising detected; and prohibiting lockup of the torque converter when said inertia cruising signal is detected even if said transition signal is generated.

According to still another aspect of the present invention, there is provided, in a motor vehicle having a cruising state in a converter area and a lockup area:

an automatic transmission provided with a torque converter; and a controller connected to said automatic transmission, said controller including:

means for determining an occurrence of transition of the cruising state of the motor vehicle from the converter area to the lockup area and generating a transition signal indicative of said occurrence of transition determined;

means for detecting an inertia cruising of the motor vehicle and generating an inertia cruising signal indicative of said inertia cruising detected; and means for prohibiting lockup of the torque converter when said inertia cruising signal is detected even if said transition signal is generated.

DETAILED DESCRIPTION OF THE INVENTION

Figure 1:
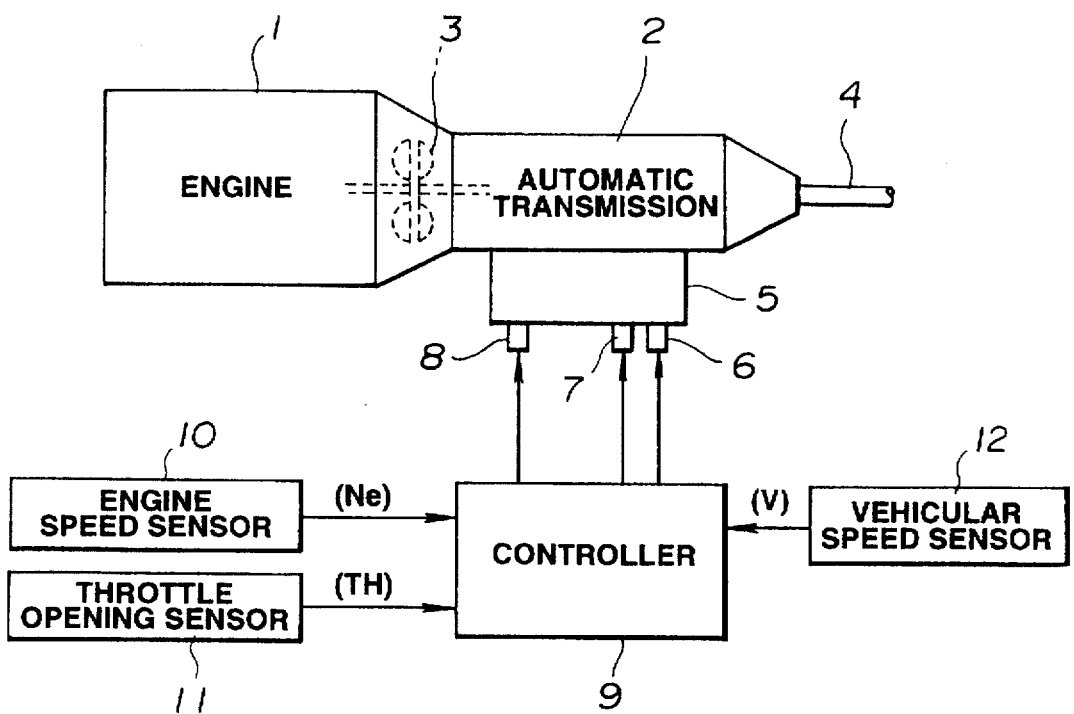
FIG. 1 is a block diagram showing a first preferred embodiment of a lockup control system for automatic transmissions according to the present invention.

Referring to the drawings wherein like reference numerals designate like parts throughout the views, preferred embodiments of a lockup control system for automatic transmissions will be described.

Figure 2:
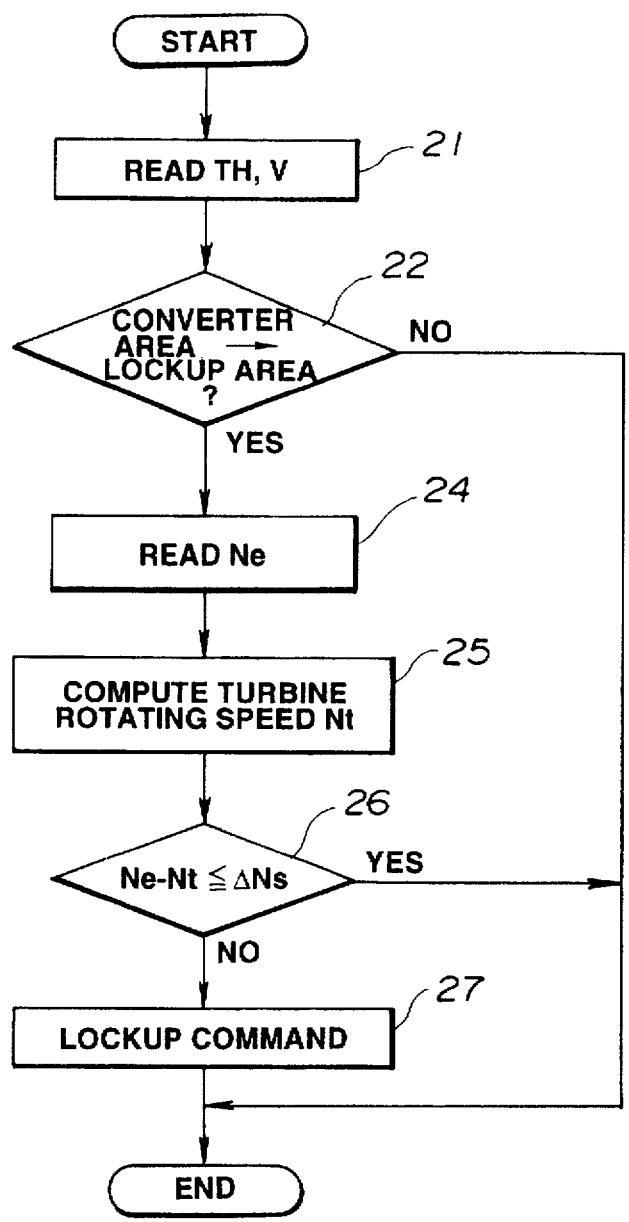
FIG. 2 is a flowchart showing operation of the first preferred embodiment of the present invention.
Figure 3:
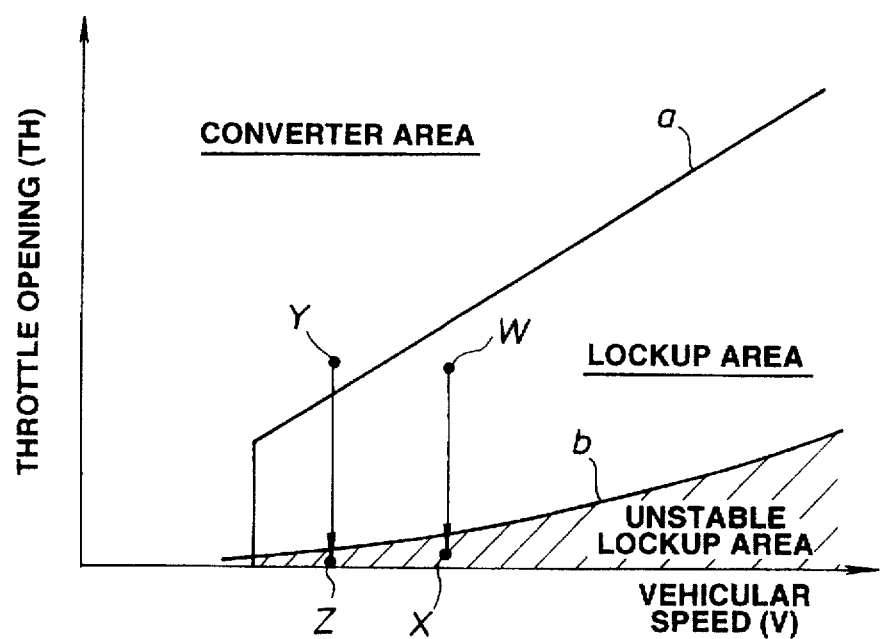
FIG. 3 is a graphical representation showing a converter area, lockup area and unstable lockup area of a torque converter in FIG. 1.

FIGS. 1–3 show a first preferred embodiment of the present invention. Referring to FIG. 1, reference numeral 1 designates an engine 1, and 2 designates an automatic transmission. The automatic transmission 2 inputs power of the engine 1 through a torque converter 3, and changes input rotation at the gear ratio corresponding to a selected speed, which is transmitted to an output shaft 4.

The automatic transmission 2 has a selected speed determined by a combination of turning-on and turning-off of shift solenoids 6, 7 in a control valve 5. The torque converter 3 is put in the lockup state, and in the converter state in accordance with turning-on and turning-off of a lockup solenoid 8 in the control valve 5.

A controller 9 is arranged to control turning-on and turning-off of the shift solenoids 6, 7 and the lockup solenoid 8. The controller 9 inputs a signal derived from an engine speed sensor 10 for sensing a revolving speed Ne of the engine 1 or input revolving speed of the torque converter 3, a signal derived from a throttle opening sensor 11 for sensing a throttle opening TH of the engine 1, and a signal derived from a vehicular velocity sensor 12 for sensing a revolving speed of the output shaft 4 of the automatic transmission 2 or vehicular velocity V.

In accordance with the above input information, the controller 9 carries out a well-known computation (not shown) for shift control. That is, a predetermined shift is carried out through operation of, first, determination of an optimal speed for the actual cruising state by, for example, the table look-up method in accordance with the throttle opening TH and the vehicular velocity V, then, turning-on and turning-off of the shift solenoids 6, 7 to select the optimal speed.

In addition to shift control, the controller 9 carries out lockup control of the torque converter 3 as will be described later in accordance with a program as shown in FIG. 2. First, at a step 21, the throttle opening TH of the engine 1 and the vehicular velocity V are read in a memory. Then, at a step 22, it is checked whether or not transition from a converter area to a lockup area is carried out by a change in the cruising state, for example, from a point Y to a point Z as shown in FIG. 3 in accordance with a lockup map having the throttle opening TH and the vehicular velocity V. It is to be noted that in FIG. 3, a line "a" is a boundary between the lockup area and the converter area defined by the throttle opening TH and the vehicular velocity V. At the step 22, if it is determined that no transition is carried out, control is terminated without performing lockup.

On the other hand, at the step 22, if it is determined that transition from the converter area to the lockup area is carried out, control proceeds to a step 24 where the engine speed Ne as input revolving speed of the torque converter 3 is read in the memory. At a subsequent step 25, a turbine revolving speed Nt as output revolving speed of the torque converter 3 is computed. For this computation of the turbine revolving speed Nt, the output revolving speed of the automatic transmission 2 sensed by the vehicular velocity sensor 12 is multiplied by a selected speed or actual gear ratio determined out of a combination of turning-on and turning-off of the shift solenoids 6, 7.

Referring to FIG. 3, at a subsequent step 26, it is checked whether or not the cruising state of a motor vehicle is found in a unstable lockup area in accordance with determination whether or not the amount of slippage Ne-Nt of the torque converter 3 obtained by a difference between the input and output revolving speeds Ne, Nt of the torque converter 3 is equal to or smaller than a set amount of slippage ΔNs corresponding to a load-load line "b" indicative of the vehicular velocity vs. the throttle opening necessary to maintain it. Fundamentally, inertia cruising of the motor vehicle can be detected when the amount of slippage Ne-Nt of the torque converter 3 is negative, which should be carried out, practically, with a time margin in view of a characteristic of operation and error of rotation of the lockup clutch piston.

At the step 26, if it is determined that the cruising state of the motor vehicle is found in the unstable lockup area, control proceeds to a step 27 where a lockup command is output to the lockup solenoid 8 so as to put the torque converter 3 in the lockup state in accordance with transition from the converter area to the lockup area as described above.

On the other hand, at the step 26, if it is determined that the cruising state of the motor vehicle is found in the unstable lockup area, control is terminated. Due to skipping of the step 27, the torque converter 3 fails to be locked up though transition from the converter area to the lockup area is carried out, practically prohibiting lockup of the torque converter 3.

Thus, it is possible to avoid an occurrence of insufficient lubrication in the rear portion of the automatic transmission 2 due to changeover of the state of the torque converter 3 from the converter state to the lockup state during inertia cruising state of the motor vehicle in the unstable lockup area wherein the above changeover is difficult to carry out since the engine speed is considerably low, and the amount of hydraulic fluid out of the pump driven by the engine 1 is small.

Such operation is carried out not only in case of an occurrence of transition from the converter area to the lockup area due to lowering of the throttle opening from the point Y to the point Z as shown in FIG. 3, but in case of an occurrence of the above transition by upshift during inertia cruising or shift by operation of an overdrive (OD) prohibition switch, or an occurrence of relockup after temporary release of lockup as countermeasures against shift shock.

Figure 4:
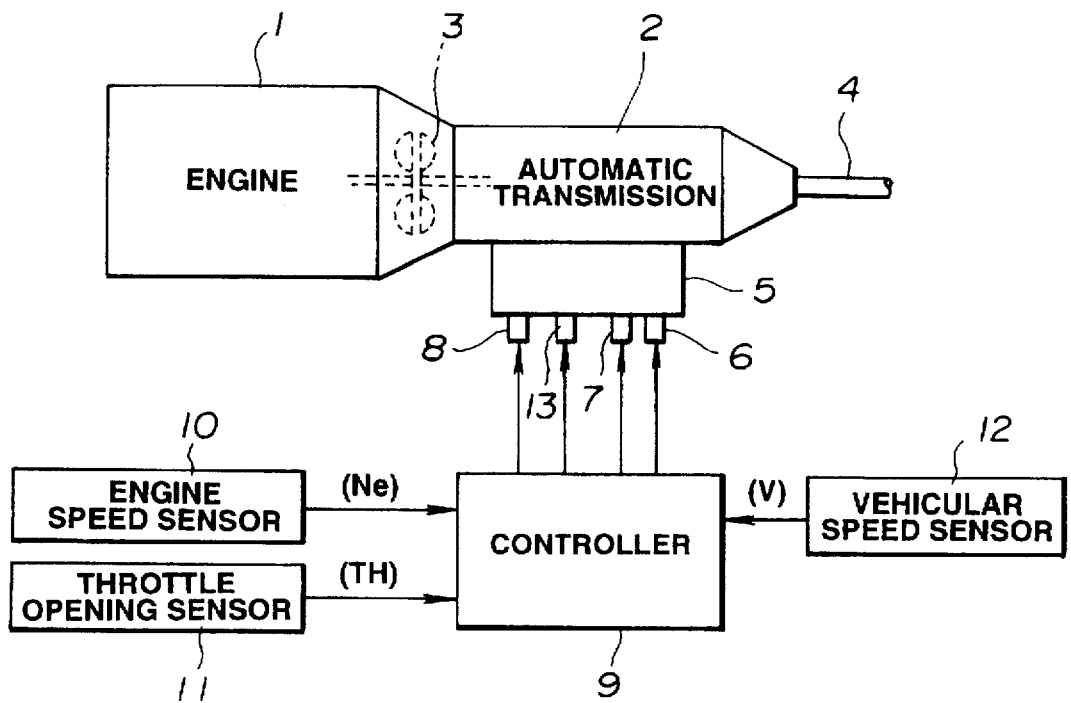
FIG. 4 is a view similar to FIG. 1, showing a second preferred embodiment of the present invention.

FIGS. 4–7 show a second preferred embodiment of the present invention. Referring to FIG. 4, the second preferred embodiment has substantially the same structure as the first preferred embodiment except for an overrun clutch solenoid 13. Even at speeds where engine brake is impossible to obtain, the automatic transmission 2 is put in the state that engine brake is active by turning-on of the overrun clutch solenoid 13.

The controller 9 is arranged to control turning-on and turning-off of the shift solenoids 6, 7, the lockup solenoid 8, and the overrun clutch solenoid 13. The controller 9 inputs a signal derived from the engine speed sensor 10 for sensing a revolving speed Ne of the engine 1 or input revolving speed of the torque converter 3, a signal derived from the throttle opening sensor 11 for sensing the throttle opening TH of the engine 1, and a signal derived from the vehicular velocity sensor 12 for sensing a revolving speed of the output shaft 4 of the automatic transmission 2 or vehicular velocity V.

In accordance with the above input information, the controller 9 carries out a well-known computation (not shown) for shift control. That is, a predetermined shift is carried out through operation of, first, determination of an optimal speed for the actual cruising state by, for example, the table look-up method in accordance with the throttle opening TH and the vehicular velocity V, then, turning-on and turning-off of the shift solenoids 6, 7 to select the optimal speed. At second and third speeds where engine brake is impossible to obtain, the controller 9 turns on the overrun clutch solenoid 13 as occasion demands, which can put the automatic transmission 2 in the state where engine brake is active even at those speeds.

Figure 5:
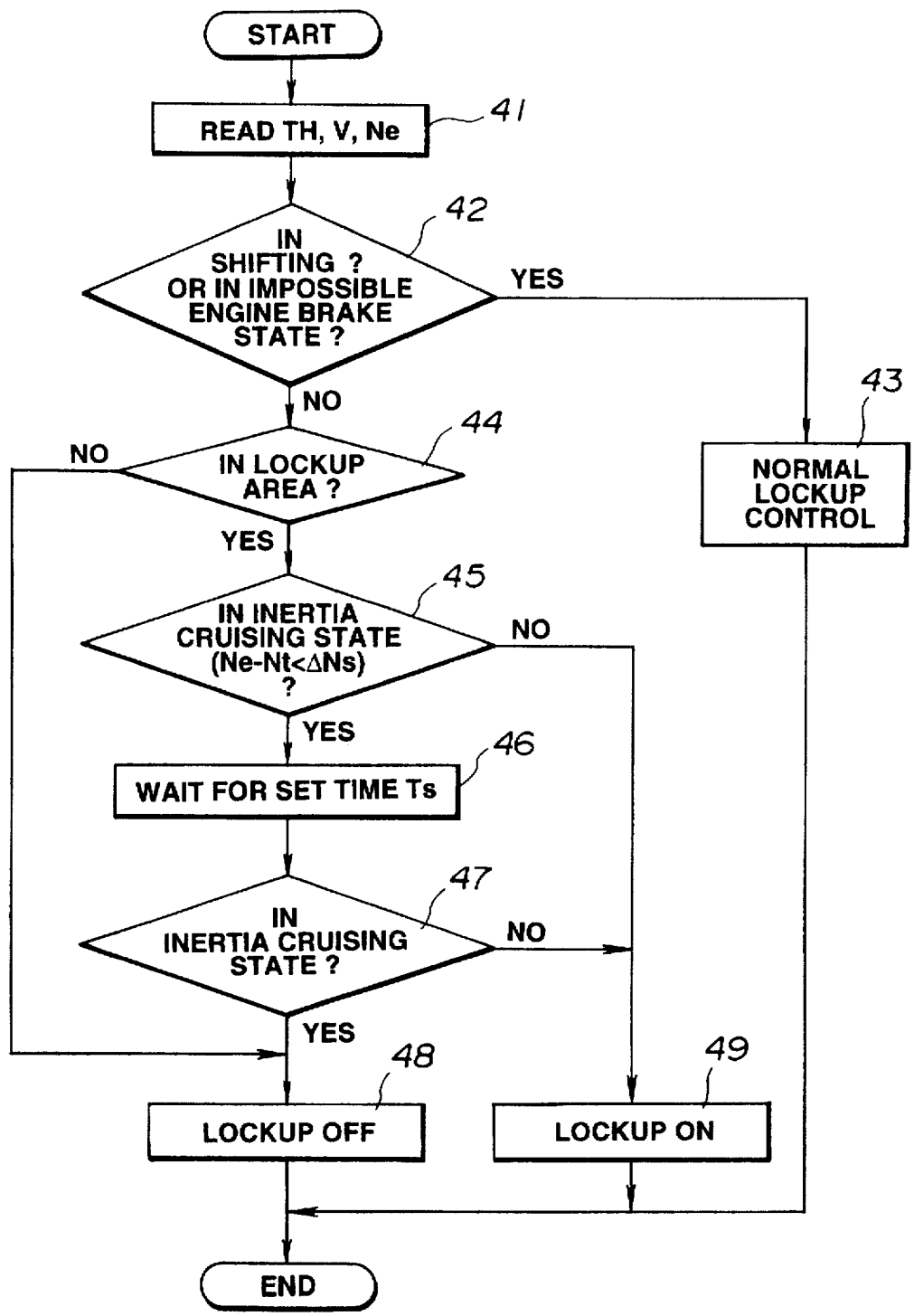
FIG. 5 is a view similar to FIG. 2, showing operation of the second preferred embodiment if the present invention.

In addition to shift control, the controller 9 carries out lockup control of the torque converter 3 as will be described later in accordance with a program as shown in FIG. 5. First, at a step 41, the throttle opening TH of the engine 1, the vehicular velocity V, and the engine speed Ne are read in a memory. Then, at a step 42, it is checked if the automatic transmission 2 is in shift by changeover of turning-on and turning-off of the shift solenoids 6, 7, or in the impossible engine brake state that the automatic transmission 2 is at speed where engine brake is impossible to obtain, and the overrun clutch solenoid 13 fails to be turned on. If it is determined that the automatic transmission 2 is in shift or in the impossible engine brake state, control proceeds to a step 43 where ordinary lockup control is carried out.

Figure 7:
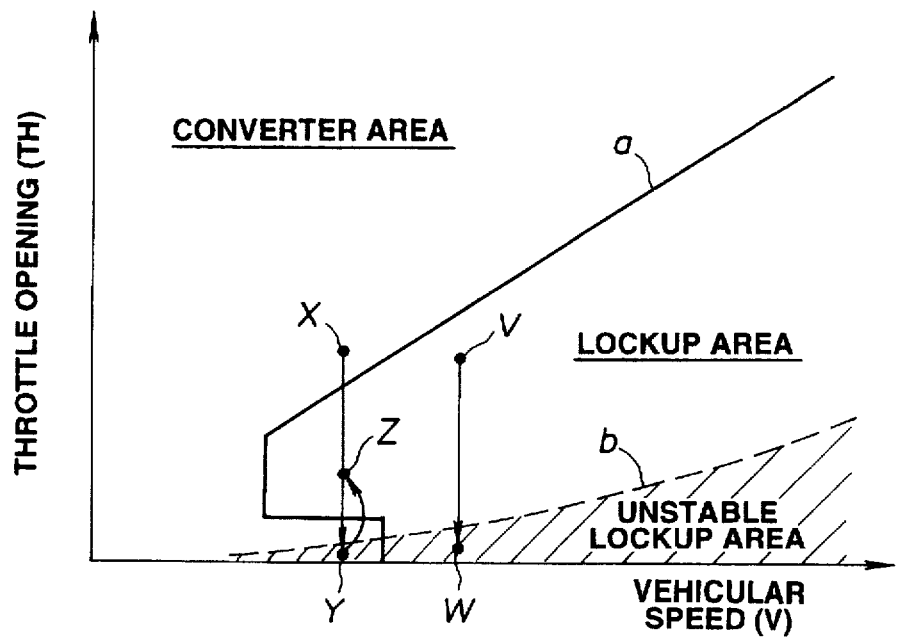
FIG. 7 is a view similar to FIG. 3, showing the converter area, lockup area and unstable lockup area of the torque converter in FIG. 4.

Referring to FIG. 7, upon ordinary lockup control, it is determined, for example, in which area the cruising state of the motor vehicle is found, in the lockup area or converter area which are defined by the throttle opening TH and the vehicular velocity V in connection with a predetermined speed or every speed, a boundary between the two being given by a line "a" in FIG. 7. And, in accordance with a result of determination, the torque converter 3 is put in the lockup state or converter state through the lockup solenoid 8.

On the other hand, at the step 42, if it is determined that the automatic transmission 2 fails to be in shift or in the impossible engine brake state, control at steps 44-49 is carried out to obtain lockup control of the present invention. That is, at the step 44, in the same way as the step 43, it is checked whether or not the cruising state is found in the lockup area in accordance with the throttle opening TH and the vehicular velocity V. If the cruising state fails to be found in the lockup area, i.e., it is found in the converter area, control proceeds to the step 48 where in response to a result of area determination, the torque converter 3 is put in the converter state through the lockup solenoid 8.

On the other hand, at the step 44, if it is determined that the cruising state is found in the lockup area, control proceeds to the step 45 where it is determined whether or not the motor vehicle is in the inertia cruising state. Upon this determination, first, the turbine revolving speed Nt as output revolving speed of the torque converter 3 is computed. For this computation of the turbine revolving speed Nt, the output revolving speed of the automatic transmission 2 sensed by the vehicular velocity sensor 12 is multiplied by an actual gear ratio corresponding to a selected speed determined out of a combination of turning-on and turning-off of the shift solenoids 6, 7. Moreover, referring to FIG. 7, it is checked whether or not the cruising state of the motor vehicle is found in the inertia cruising state in the unstable lockup area in accordance with determination whether or not the amount of slippage Ne-Nt of the torque converter 3 obtained by a difference between the input and output revolving speeds Ne, Nt of the torque converter 3 is smaller than a set amount of slippage ΔNs corresponding to a load-load line "b" as shown in FIG. 7.

At the step 45, if it is determined that the motor vehicle fails to be in the inertia cruising state wherein the engine speed is high enough, and the amount of hydraulic fluid is also large enough to make lockup certain, control proceeds to the step 49 where a lockup command is output to the lockup solenoid 8 so as to put the torque converter 3 in the lockup state in response to the result of area determination.

Figure 6:
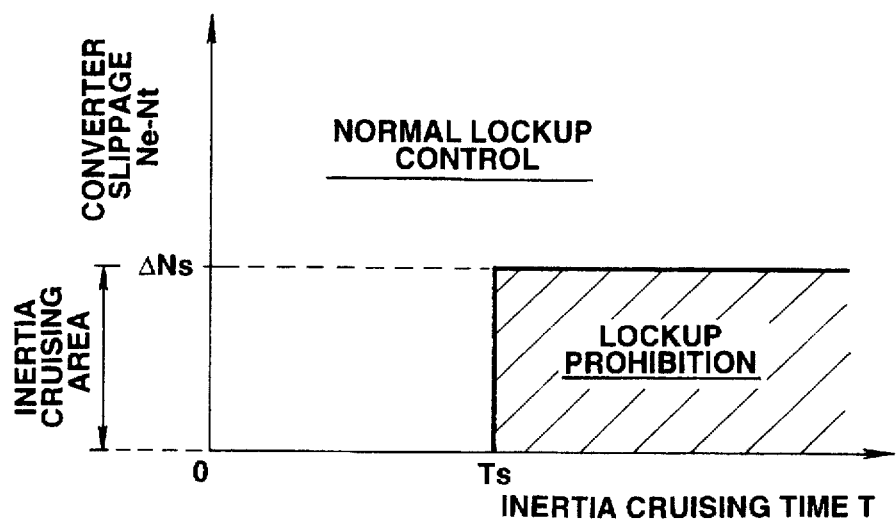
FIG. 6 is a time chart showing a lockup prohibition of the torque converter in FIG. 4.

On the other hand, at the step 45, if it is determined that the motor vehicle is in the inertia cruising state in the unstable lockup area, control proceeds to a step 46 where a wait takes place for a set time Ts. At a subsequent step 47, in the same way as the step 45, it is checked whether or not the motor vehicle is in the inertia cruising state. That is, referring to FIG. 6, at the step 45, it is determined whether or not the inertia cruising state continues for the set time Ts and more as indicated in FIG. 6. If it is determined that the inertia cruising state fails to continue for the set time Ts and more, at the step 49, the torque converter 3 is put in the lockup state in response to the above result of area determination. On the other hand, if it is determined that the inertia cruising state continues for the set time Ts and more, the torque converter 3 is put in the converter state by executing control at the step 48 for the set time Ts and more even if the cruising state of the motor vehicle is found in the lockup area.

According to the above control, lockup of the torque converter 3 is prohibited during inertia cruising even in the lockup area as shown in FIG. 6, solving a problem of early wear of a lockup clutch facing due to lack of the amount of hydraulic fluid. That is, lockup prohibition control is lagged until a lapse of the set time Ts from a start of inertia cruising. Thus, this time lag contributes to solving of the above problem arising when lockup is prohibited as soon as inertia cruising is started, i.e., an occurrence of vibrations due to a sudden increase in slippage of the torque converter 3 when lockup is released immediately in response to a change in the cruising state of lowering the throttle opening TH from a point V to a point W in the lockup area as shown in FIG. 7. Moreover, this time lag solves another problem of unstable control due to hunting of lockup control produced in case where the throttle opening TH is decreased from a point X in the converter area to a point Y in the unstable lockup area, then increased to a point Z in the lockup area as shown in FIG. 7, and lockup is released as soon as the cruising state of the motor vehicle is in the unstable lockup area.

Since the turbine revolving speed Nt or input revolving speed of the automatic transmission 2 used for determination of cruising state at the steps 44 and 47 is obtained by multiplying the output revolving speed of the automatic transmission 2 by the gear ratio determined out of the speed actually selected, the turbine revolving speed Nt cannot exactly be computed during shift of the automatic transmission 2 and in the impossible engine brake state. Thus, when carried out during shift of the automatic transmission 2 and in the impossible engine brake state, the above lockup prohibition operation lag control will be inappropriate due to inexact results of determination for the inertia cruising state of the motor vehicle at the steps 45 and 47. However, in this embodiment, ordinary lockup control is carried out at the step 43 without executing the above lockup prohibition operation lag control during shift of the automatic transmission 2 and in the impossible engine brake state, resulting in prevention of inappropriate lockup prohibition operation lag control.

Having described the present invention in connection with the preferred embodiment, it is to be noted that the present invention is not limited thereto, and various changes and modifications are possible without departing from the spirit of the present invention.

What is claimed is:

1. A system for controlling lockup operation of a torque converter of an automatic transmission of a motor vehicle, wherein the torque converter operates in a converter state when the vehicle is cruising in a converter area and in a lockup state when the vehicle is cruising in a lockup area, the system comprising:

means for determining whether the motor vehicle is cruising in the converter area or in the lockup area and generating a first signal indicative of the cruising area of the vehicle;

means for detecting whether the vehicle is coasting when the first signal indicates that the vehicle is cruising in the lockup area and generating a second signal indicative thereof; and means for prohibiting lockup of the torque converter when the second signal indicates that the vehicle is coasting, even while the first signal indicates that the vehicle is cruising in the lockup area.

2. A system for controlling lockup operation of a torque converter of an automatic transmission of a motor vehicle, wherein the torque converter operates in a converter state when the vehicle is cruising in a converter area and in a lockup state when the vehicle is cruising in a lockup area, the system comprising:

means for determining whether the motor vehicle is cruising in the converter area or in the lockup area and generating a first signal indicative of the cruising area of the vehicle;

means for detecting whether the vehicle is coasting when the first signal indicates that the vehicle is cruising in the lockup area and generating a second signal indicative thereof;

means for redetecting whether the vehicle is coasting after a predetermined period has lapsed after the second signal indicates that the vehicle is coasting and generating a third signal indicative thereof; and means for prohibiting lockup of the torque converter when the third signal indicates that the vehicle is coasting.

3. A system as claimed in claim 2, further comprising:

means for overriding the lockup prohibition means when a shifting operation of the transmission is undergoing or when engine braking cannot be sufficiently obtained.

4. A method of controlling lockup operation of a torque converter of an automatic transmission of a motor vehicle, wherein the torque converter operates in a converter state when the vehicle is cruising in a converter area and in a lockup state when the vehicle is cruising in a lockup area, the method comprising the steps of:

determining whether the motor vehicle is cruising in the converter area or in the lockup area and generating a first signal indicative of the cruising area of the vehicle;

detecting whether the vehicle is coasting when the first signal indicates that the vehicle is cruising in the lockup area and generating a second signal indicative thereof; and prohibiting lockup of the torque converter when said second signal indicates that the vehicle is coasting, even while the first signal indicates that the vehicle is cruising in the lockup area.

5. A method of controlling lockup operation of a torque converter of an automatic transmission of a motor vehicle, wherein the torque converter operates in a converter state when the vehicle is cruising in a converter area and in a lockup state when the vehicle is cruising in a lockup area, the method comprising the steps of:

determining whether the motor vehicle is cruising in the converter area or in the lockup area and generating a first signal indicative of the cruising area of the vehicle;

detecting whether the vehicle is coasting when the first signal indicates that the vehicle is cruising in the lockup area and generating a second signal indicative thereof;

redetecting whether the vehicle is coasting after a predetermined period has lapsed after the second indicates that the vehicle is coasting and generating a third signal indicative thereof; and prohibiting lockup of the torque converter when the third signal indicates that the vehicle is coasting.

6. A method as claimed in claim 5, further comprising the step of:

overriding lockup prohibition when a shifting operation of the transmission is undergoing or when engine braking cannot be sufficiently obtained.

7. A motor vehicle comprising:

an automatic transmission with a torque converter, wherein the torque converter operates in a converter state when the vehicle is cruising in a converter area and in a lockup state when the vehicle is cruising in a lockup area; and a controller for controlling lockup operation of the torque converter, the controller comprising:

means for determining whether the motor vehicle is cruising in the converter area or in the lockup area and generating a first signal indicative of the cruising area of the vehicle;

means for detecting whether the vehicle is coasting when the first signal indicates that the vehicle is cruising in the lockup area and generating a second signal indicative thereof; and means for prohibiting lockup of the torque converter when said second signal indicates that the vehicle is coasting, even while the first signal indicates that the vehicle is cruising in the lockup area.

8. A motor vehicle comprising:

an automatic transmission with a torque converter, wherein the torque converter operates in a converter state when the vehicle is cruising in a converter area and in a lockup state when the vehicle is cruising in a lockup area; and a controller for controlling lockup operation of the torque converter, the controller comprising:

means for determining whether the motor vehicle is cruising in the converter area or in the lockup area and generating a first signal indicative of the cruising area of the vehicle;

means for detecting whether the vehicle is coasting when the first signal indicates that the vehicle is cruising in the lockup area and generating a second signal indicative thereof;

means for redetecting whether the vehicle is coasting after a predetermined period has lapsed after the second signal indicates that the vehicle is coasting and generating a third signal indicative thereof; and means for prohibiting lockup of the torque converter when the third signal indicates that the vehicle is coasting.

9. A motor vehicle as claimed in claim 8, wherein said controller further includes:

means for overriding the lockup prohibition means when a shifting operation of the transmission is undergoing or when engine braking cannot be sufficiently obtained.

* * * * *